United States Patent
Ito

(10) Patent No.: US 7,443,424 B2
(45) Date of Patent: Oct. 28, 2008

(54) DIGITAL CAMERA RECORDING AN ARBITRARY FRAME OF A MOTION PICTURE

(75) Inventor: Kenji Ito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 728 days.

(21) Appl. No.: 10/630,903

(22) Filed: Jul. 31, 2003

(65) Prior Publication Data
US 2004/0021782 A1 Feb. 5, 2004

(30) Foreign Application Priority Data
Jul. 31, 2002 (JP) .......................... P. 2002-223149

(51) Int. Cl.
*H04N 5/225* (2006.01)
*H04N 5/76* (2006.01)
(52) U.S. Cl. ............................... 348/220.1; 348/231.6
(58) Field of Classification Search ............... 348/220.1, 348/221.1, 231.99, 231.3, 231.6; 386/120
See application file for complete search history.

(56) References Cited

U.S. PATENT DOCUMENTS

| 3,627,922 | A | * | 12/1971 | Goldmark et al. ........... 348/100 |
| 5,809,208 | A | | 9/1998 | Komori et al. |
| 5,982,984 | A | | 11/1999 | Inuiya et al. |
| 6,222,986 | B1 | | 4/2001 | Inuiya et al. |
| 6,359,643 | B1 | * | 3/2002 | Visvanathan et al. ...... 348/14.14 |
| 6,734,910 | B1 | * | 5/2004 | Yumoto et al. .......... 348/333.12 |
| 7,064,780 | B2 | * | 6/2006 | Shimizu .................. 348/220.1 |
| 7,139,020 | B2 | * | 11/2006 | Tamashima .............. 348/231.3 |
| 2002/0044766 | A1 | * | 4/2002 | Niida ......................... 386/108 |
| 2003/0031469 | A1 | * | 2/2003 | Hirai .......................... 386/120 |
| 2003/0133022 | A1 | * | 7/2003 | Melton ..................... 348/231.2 |
| 2005/0231631 | A1 | * | 10/2005 | Miyazaki ................... 348/362 |

FOREIGN PATENT DOCUMENTS

| JP | 10-285523 A | 10/1998 |
| JP | 11-046314 | 2/1999 |
| JP | 11-205675 | 7/1999 |
| JP | 2000-76462 A | 3/2000 |
| JP | 2000-250621 | 9/2000 |
| JP | 2001-245193 A | 9/2001 |
| JP | 2001-320665 A | 11/2001 |

* cited by examiner

*Primary Examiner*—Lin Ye
*Assistant Examiner*—Timothy J Henn
(74) *Attorney, Agent, or Firm*—Sughrue Mion, PLLC

(57) ABSTRACT

Providing a digital camera which can identify a print target scene readily and in a short time When shooting is made in the motion picture mode, the motion picture data of a subject image shot with an image pickup device is compressed on a per frame basis in a compression/decompression processor and recorded onto a memory card. In this practice, marking data is added to a frame to be printed in accordance with an instruction from the user. When the motion picture data recorded on the recording medium is read, a frame where marking data is added is searched for. Each time the frame is detected, the frame and a predetermined number of frames in the neighborhood of the frame are decompressed in the compression/decompression processor and replayed slowly on an image display LCD. When an arbitrary frame displayed during slow playback is specified, the frame is recorded as still picture data onto the memory card.

18 Claims, 7 Drawing Sheets

DIGITAL CAMERA RECORDING AN ARBITRARY FRAME OF A MOTION PICTURE

BACKGROUND OF THE INVENTION

1. Field of the Invention

The present invention relates to a digital camera for taking a motion picture by way of its image pickup device and recording the motion picture onto a recording medium, and in particular to a digital camera which can record an arbitrary frame of motion picture data as still picture data for printing.

2. Description of Related Art

According to the related art, in case a scene in a motion picture taken with a digital camera was to be printed, motion picture data recorded onto a recording medium was replayed and pause operation was made to display a still picture when a target scene was displayed, then the still picture was used as print data. Thus, in order to identify a scene to be printed, the user had to diligently perform operations such as fast forward, skip, pause and playback while watching the replay screen. This was very cumbersome. Further, it was quite difficult to identify a scene in motion picture data in units of frames.

In order to solve such problems, a digital camera described in the Japanese Patent Laid-Open No. 2001-320665 readily identifies a scene to be printed for later print instruction by performing frame-by-frame playback of motion picture data. The digital camera disclosed in the Japanese Patent Laid-Open No. 2001-320665 identifies on a per frame basis a print target scene in a motion picture file in advance and records the corresponding information together with the motion picture file onto a recording medium for selection of a scene from among the print target scenes in printing.

However, according to a system where motion picture data is replayed frame by frame such as on a digital camera disclosed in the Japanese Patent Laid-Open No. 2001-320665, it takes a very long time to locate a target scene from all the motion picture data recorded on a recording medium. Fast forward and skip operations must be diligently performed in order to shorten the time required to locate the target scene.

It is also necessary to separately prepare a management file which records information for identifying motion picture files and print target scenes and refer to the management file each time printing is made. This complicates the whole process.

SUMMARY OF THE INVENTION

The invention has been accomplished in view of the above mentioned problems and aims at providing a digital camera which can identify on a per frame basis a scene in the data of a motion picture taken, readily and in a short time, thereby acquiring the still picture data of the scene, without complicating the process of identifying a print target scene.

In order to solve the problems, the first aspect of the invention is a digital camera comprising an image pickup device for shooting a subject image, motion picture compression means for compressing on a per frame basis the motion picture data of a subject image shot with the image pickup device and recording the compressed data onto a recording medium, marking instruction means for instructing addition of marking data to an arbitrary frame in recording the motion picture data onto the recording medium, marking means for adding marking data to a frame specified by the marking instruction means, search means for detecting a frame where the marking data is added while reading motion picture data from the recording medium, motion picture decompression means for decompressing the frame and a predetermined number of frames in the neighborhood of the frame on a per frame basis each time the frame where the marking data is added is detected by the search means, playback means for replaying the decompressed frame, selection means for selecting an arbitrary frame displayed during playback by the playback means, and still picture data recording means for recording a frame selected by the selection means as still picture data onto the recording medium.

The frame and a predetermined number of frames in the neighborhood of the frame according to the first aspect of the invention are for example a frame where marking data is added and a predetermined number of frames subsequent to the frame or a frame where marking data is added and a predetermined number of frames preceding and subsequent to the frame.

According to the first aspect of the invention, the motion picture data of a subject image taken by an image pickup device is compressed on a per frame basis and recorded onto a recording medium. In this practice, marking data is added to a frame to be printed in accordance with an instruction from the user. When the motion picture data recorded on the recording medium is read, a frame where marking data is added is searched for. Each time the frame is detected, the frame and a predetermined number of frames in the neighborhood of the frame are replayed. When an arbitrary frame displayed during playback is specified, the frame is recorded as still picture data onto the recording medium. In this way, in readout of motion picture data, a frame where marking data is added is searched for, the frame and a predetermined number of frames in the neighborhood of the frame are replayed each time the frame is detected, and a frame specified by the user during playback is recorded as still picture data onto the recording medium. This identifies on a per frame basis a scene in motion picture data readily and in a short time and acquires the still picture data of the scene, without complicating the process of identifying a print target scene.

A digital camera according to the second aspect of the invention is characterized in that the recording medium is a nonvolatile recording medium detachable from a digital camera main unit.

According to the second aspect of the invention, a recording medium where print still picture data is recorded with a digital camera of the invention can be attached to an external device such as a printer and a personal computer to print a desired print target scene.

A digital camera according to the third aspect of the invention further comprises an interface for outputting still picture data recorded on the recording medium to an external device.

According to the third aspect of the invention, it is possible to output the still picture data of a print target scene from a digital camera of the invention to an external device for printing.

Brief description of the invention has been made herein above. By reading the following embodiment of the invention referring to the attached drawings will further clarify the details of the invention.

DETAILED DESCRIPTION OF THE PREFERRED EMBODIMENTS

Figure 1:
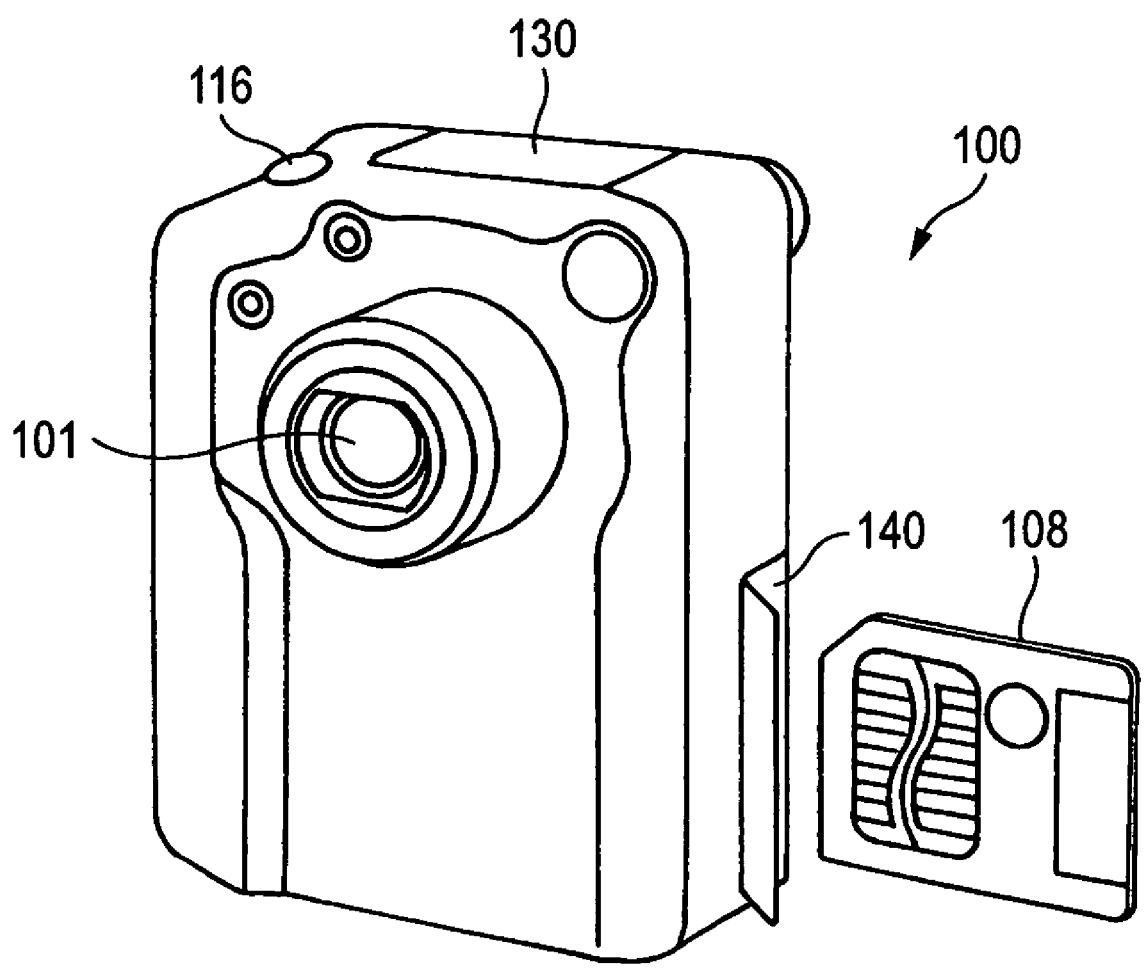
FIG. 1 is a perspective view showing an external configuration of an embodiment of a digital camera according to the invention.
Figure 2:
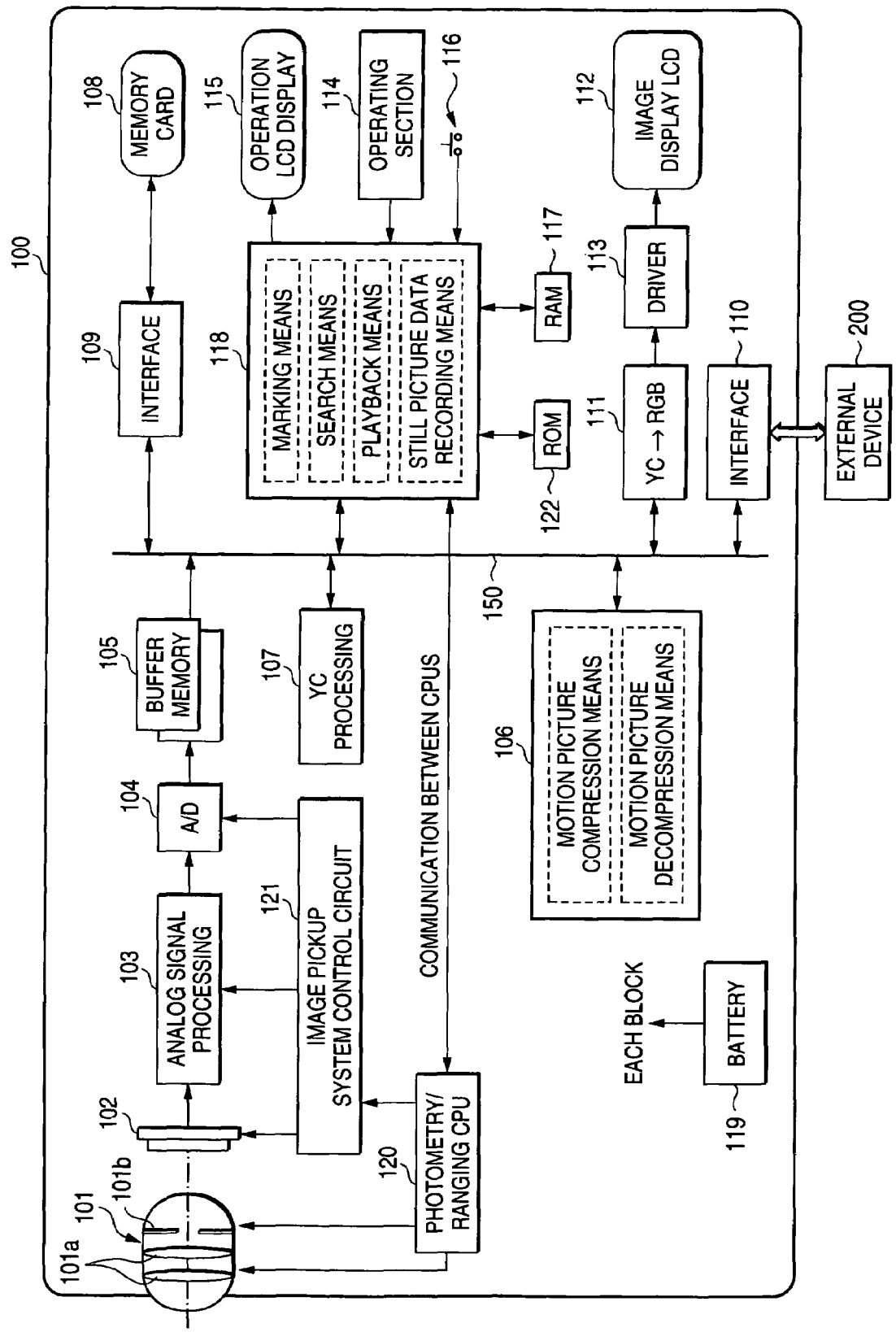
FIG. 2 is a block diagram showing a system configuration example of an embodiment of a digital camera according to the invention.

A preferred embodiment of the invention will be described referring to the drawings. Throughout the drawings, common components are given the same signs for easy understanding. FIG. 1 is a perspective view showing an external configuration of an embodiment of a digital camera according to the invention. FIG. 2 is a block diagram showing a system configuration example of an embodiment of a digital camera according to the invention.

As shown in FIG. 1, a digital camera 100 comprises a digital camera main unit (enclosure) 130, optical system apparatus 101 which forms a subject image on an image pickup device 102 (see FIG. 2) provided inside the digital camera main unit 130, a release switch 116 for executing shooting, a memory slot 140, and a nonvolatile memory card (recording medium) 108 inserted detachably into the memory slot 140 and retained by the digital camera main unit 130. The optical system apparatus 101 is provided on the front of the digital camera main unit 130. The memory slot 140 is provided on one side of the digital camera main unit 130.

As shown in FIG. 2, the digital camera 100 further comprises, as its signal processing system configuration, the image pickup device 102, an analog signal processor 103, an A/D converter 104, a buffer memory 105, a compression/decompression processor 106, a YC separator 107, the memory card 108, a media interface 109, an external device interface 110, a YC-to-RGB converter 111, an image display LCD (Liquid Crystal Display) 112 as image display means, an LCD driver 113, an operating section 114, an operation screen LCD 115, the release switch 116, a RAM (Random Access Memory) 117, a ROM (Read-only Memory) 122, a main CPU (Central Processing Unit) 118 as control means, a battery 119, a photometry/ranging CPU 120, and an image pickup system control circuit 121. The components of the digital camera 100 shown in FIG. 2 are provided on the digital camera main unit 130. As shown by arrows in FIG. 2, some of the components of the digital camera 100 are interconnected to allow communications via a common data bus 150.

The optical system apparatus 101 comprises a shooting lens 101a such as AF lens and an aperture 101b. The shooting lens 101a forms a subject image on the photo-detecting surface of the image pickup device 102 through the aperture 101b. The image pickup device 102 is a CCD (Charge-coupled Device) comprising a large number of photoreceptor devices arranged in matrix or honeycomb shape. The image pickup device 102 outputs an image signal according to the luminance of a light incident on each photoreceptor device to the analog signal processor 103.

The analog signal processor 103 performs predetermined analog signal processing such as noise reduction, white balancing and gamma processing on the input image signal and outputs the processed signal to the A/D converter 104. The A/D converter 104 converts the input analog signal to a digital image signal and outputs the digital image signal to the buffer memory 105. The buffer memory 105 is a memory for temporarily storing the digital image data in recording the data onto the memory card 108.

The compression/decompression processor 106 compresses the image data stored in the buffer memory 105 by using a predetermined compression system such as the JPEG (Joint Photographic Experts Group) system and records the resulting data onto the memory card 108, or decompresses the image data read from the memory card 108. The compression/decompression processor 106 comprises a still picture compression/decompression feature provided by the JPEG system and the motion picture compression/decompression feature provided by the motion JPEG system as motion picture compression means and motion picture decompression means. The YC separator 107 converts the uncompressed image data to be sent to the compression/decompression processor 106 to YC data, that is, luminance data Y and color-difference data Cr, Cb.

The memory card 108 is a small-sized semiconductor recording medium mounting a flash memory and is mounted replaceably into a memory slot 140 formed on the digital camera main unit 130 of the digital camera 100. Image data write/read to/from the memory card 108 is made via the media interface 109.

The external interface 110 is communications means which works as a communications interface between the digital camera 100 and the external device 200 such as a personal computer and a printer. Forms of communications with the external device 200 by the external device interface 110 are for example wired communications via interconnection using a USB cable or printer cable, or radio communications using radio waves or infrared rays.

The YC-to-RGB converter 111 converts to an RGB signal a luminance signal and a color-difference signal generated through YC separation in displaying on the image display LCD 112 the image data (still picture or motion picture) recorded on the memory card 108. The LCD driver 113 drives the image display LCD 112 based on the RGB signal, which causes the image display LCD 112 to display a color image. The image display LCD 112 is provided on the back of the digital camera main unit 130.

Figure 3:
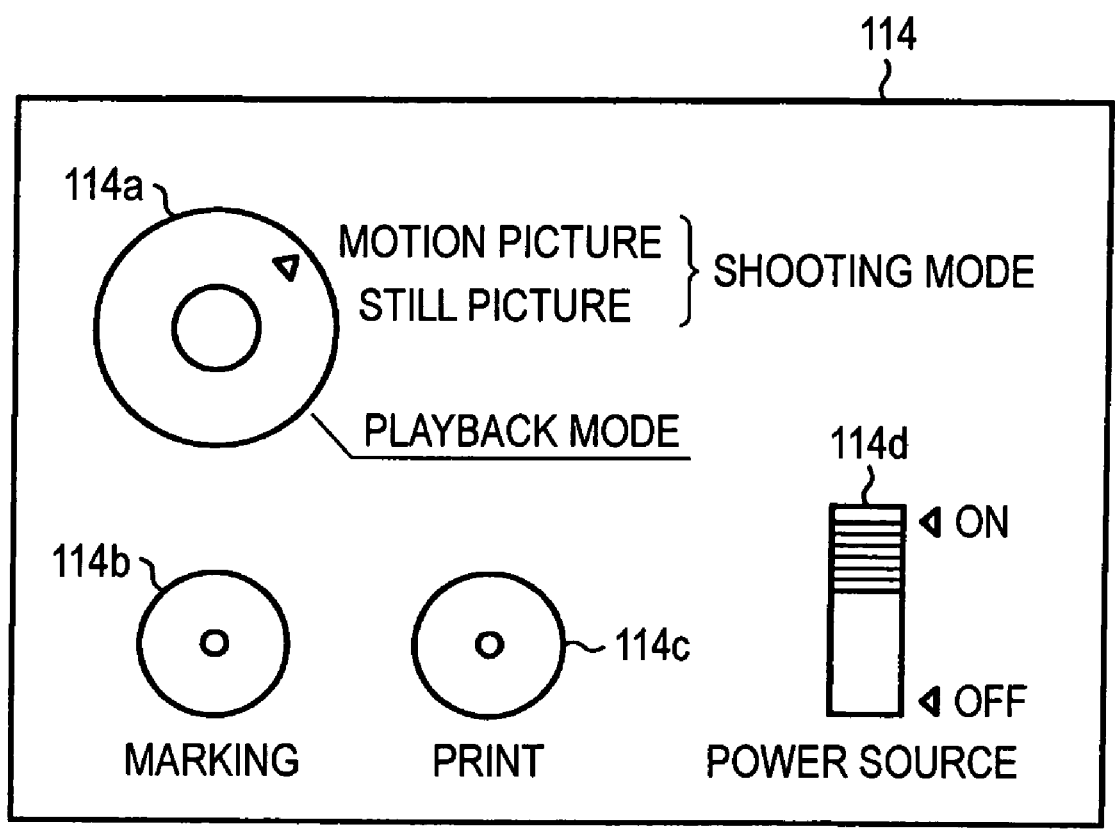
FIG. 3 is a plan view illustrating a configuration of the digital camera shown in FIG. 2.

The operating section 114 is provided, for example, on the back of the digital camera main unit 130. As shown in FIG. 3, the operating section 114 comprises a mode dial 114a, a marking button 114b, a print button 114c, and a power switch 114d. The mode dial 114a is a selector switch of rotary dial shape. Operating the mode dial 114a switches between the shooting mode and the playback mode. The shooting mode includes the still picture shooting mode and the motion picture shooting mode.

The marking button 114b is marking instruction means comprising a push button switch for instructing addition of marking data to a frame to be printed. Pressing the marking button 114b in the motion picture shooting mode adds the marking data to the current frame shot.

The print button 114c is selection means comprising a push button switch for selecting a frame to be printed. Pressing the print button 114c in the playback mode records the frame currently displayed on the image display LCD 112 onto the memory card 108 as print still picture data (hereinafter referred to as a print file).

On the operation screen LCD 115 are displayed the current mode and the state of the battery 119, as well as various messages. The operation screen LCD 115 is provided on the back of the digital camera main unit 130.

The release switch 116 is a switch for instructing start of shooting to the digital camera 100. In the still picture shooting mode, pressing the switch halfway performs focus control and aperture control of the optical system apparatus 101. Pressing the switch all the way in performs shooting, that is, capture of a subject image by the image pickup device 102, the analog signal processor 103 and the A/D converter 104. In the motion picture shooting mode, pressing the switch starts recording of motion picture data. In either shooting mode, the optical system apparatus 101 is controlled by the photometry/ranging CPU 120 and the image pickup device 102 is controlled by the image pickup system control circuit 121.

The RAM 117 serves as a working area used by the CPU 118 to execute various types of processing. The ROM 122 stores a processing program to implement various features of the digital camera 100. The main CPU 118 serves as control means for executing the processing program recorded in the ROM 122 and controlling the whole system of the digital camera 100 in accordance with the processing program. The main CPU 118 comprise such features as marking means for adding marking data to an arbitrary frame in motion picture data specified by the marking button 114*b* when the motion picture data is recorded onto the memory card 108, search means for detecting a frame where marking data is added while reading motion picture data from the memory card 108, playback means for replaying, for example slowly, a frame decompressed by the compression/decompression processor 106, and still picture data recording means for recording as a print file a frame selected by a press on the print button 114*c* onto the memory card 108.

Figure 4:
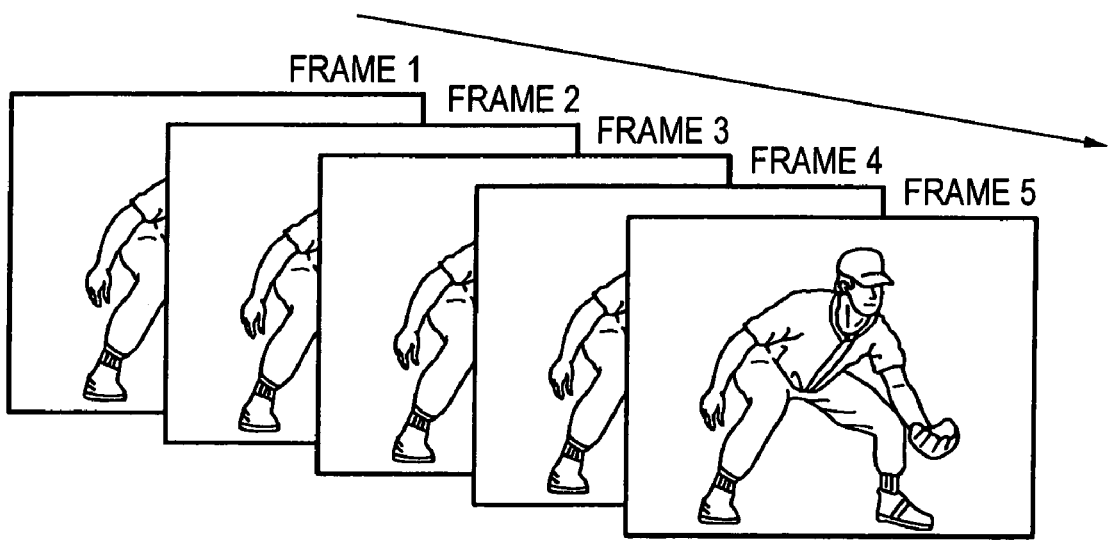
FIG. 4A explains the relationship between frames according to the motion JPEG system and compressed data for a case where a plurality of frames (still picture data) are successively shot.
FIG. 4B explains the relationship between frames according to the motion JPEG system and compressed data for a case where the motion compression system performs on a per frame basis JPEG compression on frames and records the compressed frames.
Figure 4:
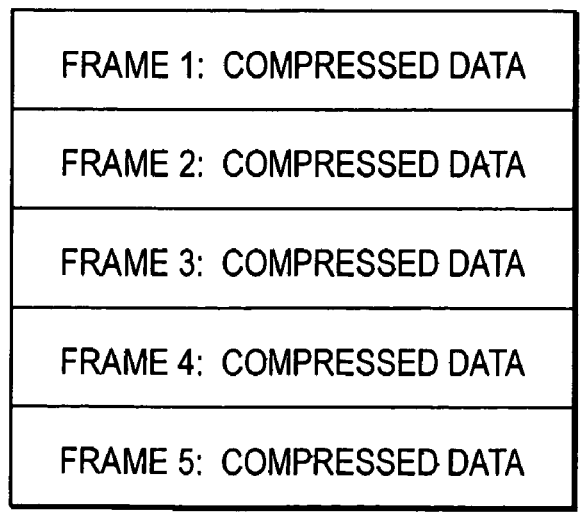

FIGS. 4A and 4B show the relationship between a frame and compressed data in the motion JPEG system. The motion JPEG system is a motion picture compression system which, as shown in FIG. 4B, JPEG-compresses and records on a per frame basis a plurality of frames (still picture data) successively shot as shown in FIG. 4A. Thus, the main CPU 118 can add marking data to an arbitrary frame in motion picture data when the motion picture data converted to YC data by the YC separator 107 undergoes motion picture compression in the compression/decompression processor 106, or detect a frame where marking data is added before the data which has undergone motion picture compression is decompressed in the compression/decompression processor 106.

Figure 5:
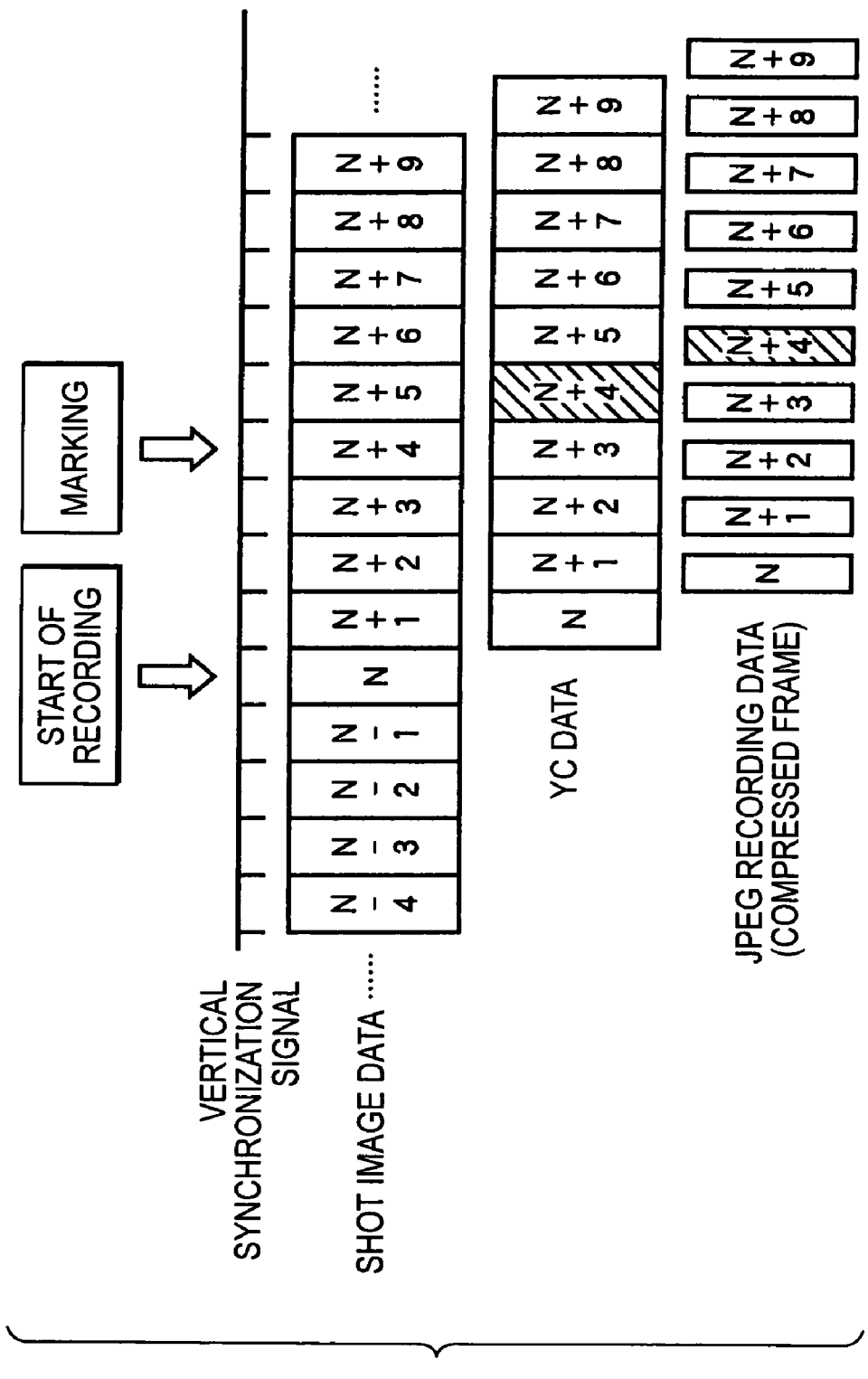
FIG. 5 explains the operation of adding marking data to an arbitrary frame in motion picture data.

FIG. 5 explains the operation of adding marking data to an arbitrary frame in motion picture data. Data of shot image in FIG. 5 shows a frame (still picture data) shot with the image pickup device 102 and sequentially recorded into the buffer memory 105 via the analog signal processor 103 and the A/D converter 104. In an example shown in FIG. 5, when the Nth frame is recorded into the buffer memory 105, the release switch 116 is pressed to instruct start of recording motion picture data. When the N+4th frame is recorded into the buffer memory 105, the marking button 114*b* is pressed to issue a marking instruction. When a recording start instruction is made, the subsequent shot image data is converted to YC data by the YC separator 107 and recorded onto the memory card 108 by way of the JPEG compression system. When a marking instruction is made, the frame recorded into the buffer memory 105 at that moment undergoes conversion to YC data and JPEG compression, then the frame is assigned marking data and recorded onto the memory card 108.

Figure 6:
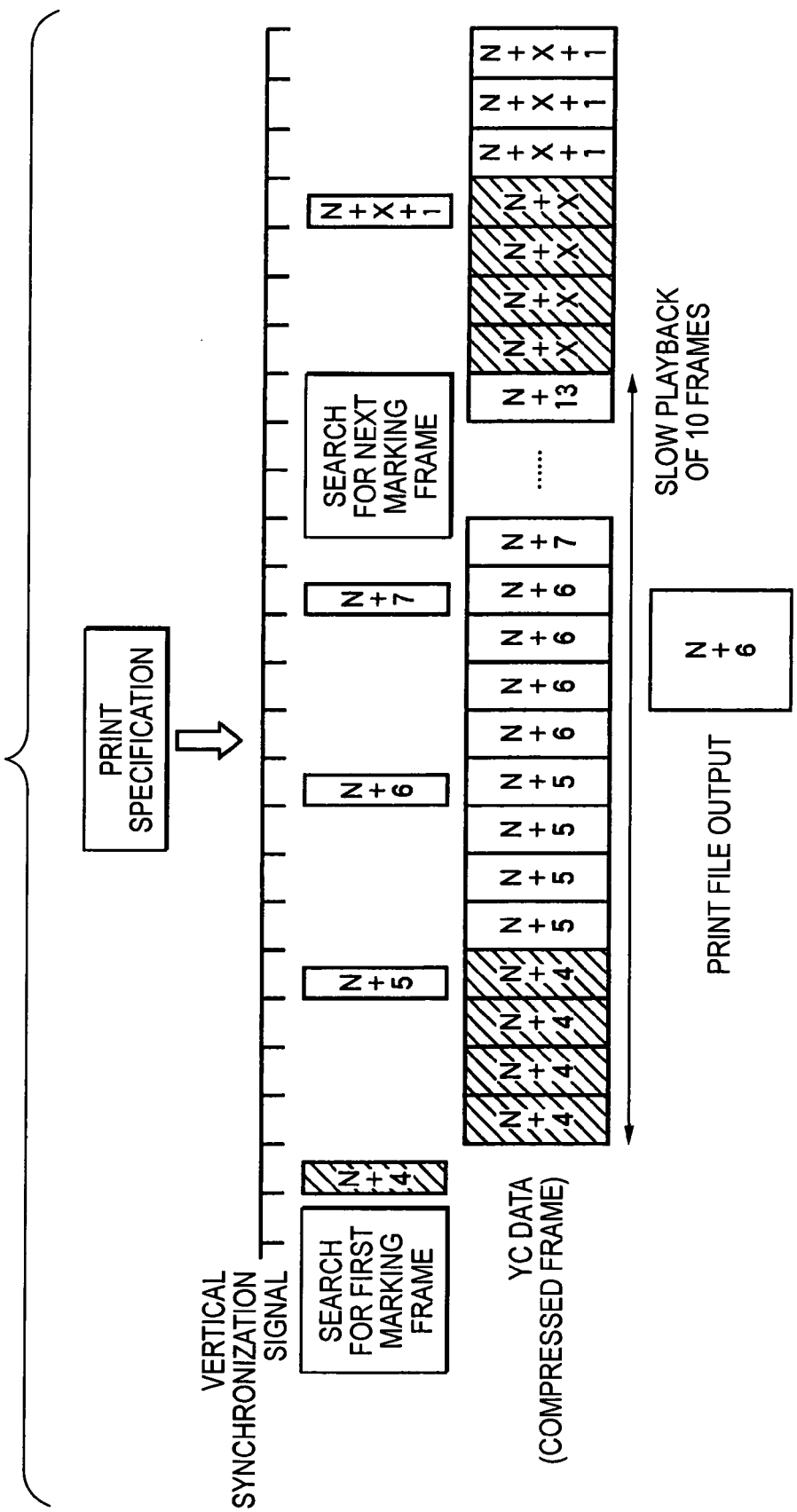
FIG. 6 explains the operation of replaying a frame where marking data is added.

FIG. 6 explains the operation of replaying a frame where marking data is added. An example shown in FIG. 6 assumes a case that, each time a compressed frame where marking data is added is detected, ten frames starting with the frame are replayed in four-fold slow motion. In this example, the N+4th frame is the first frame so that the decompressed frames (YC data) from the N+1th frame to the N+13th frame are respectively converted to four-frame data. This causes the regenerated image from the N+1th frame to the N+13th frame to be displayed on the image display LCD 112 at a playback speed of one fourth the regular speed. In this example, the print button 114*c* is pressed when the image of the N+6th frame is displayed thus making a print instruction. When a print instruction is made, the specified frame is recorded as a print file onto the memory card 108.

In an example shown in FIG. 6, the N+Xth frame is the next frame, so that the decompressed frames from the N+Xth frame to the N+X+9th frame are respectively converted to four-frame data. Frames from the N+14th frame to the N+X−1th frame are skipped because there are no frames where marking data is added. In this example, following slow playback of the frames from the N+4th frame to the N+13th frame, playback of the frames from the N+14th frame to the N+X−1 frame are skipped, then the slow playback restarts from the N+Xth frame.

Figure 7:
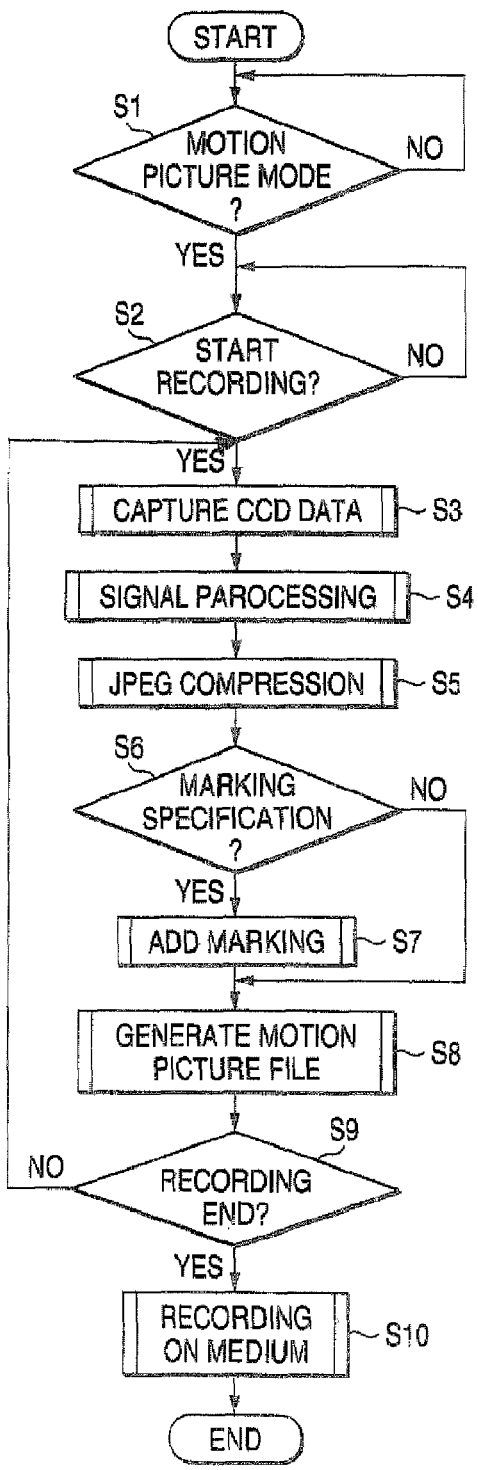
FIG. 7A shows the operation flow of motion picture recording of the digital camera shown in FIG. 2.
FIG. 7B shows the operation flow of motion picture playback of the digital camera shown in FIG. 2.
Figure 7:
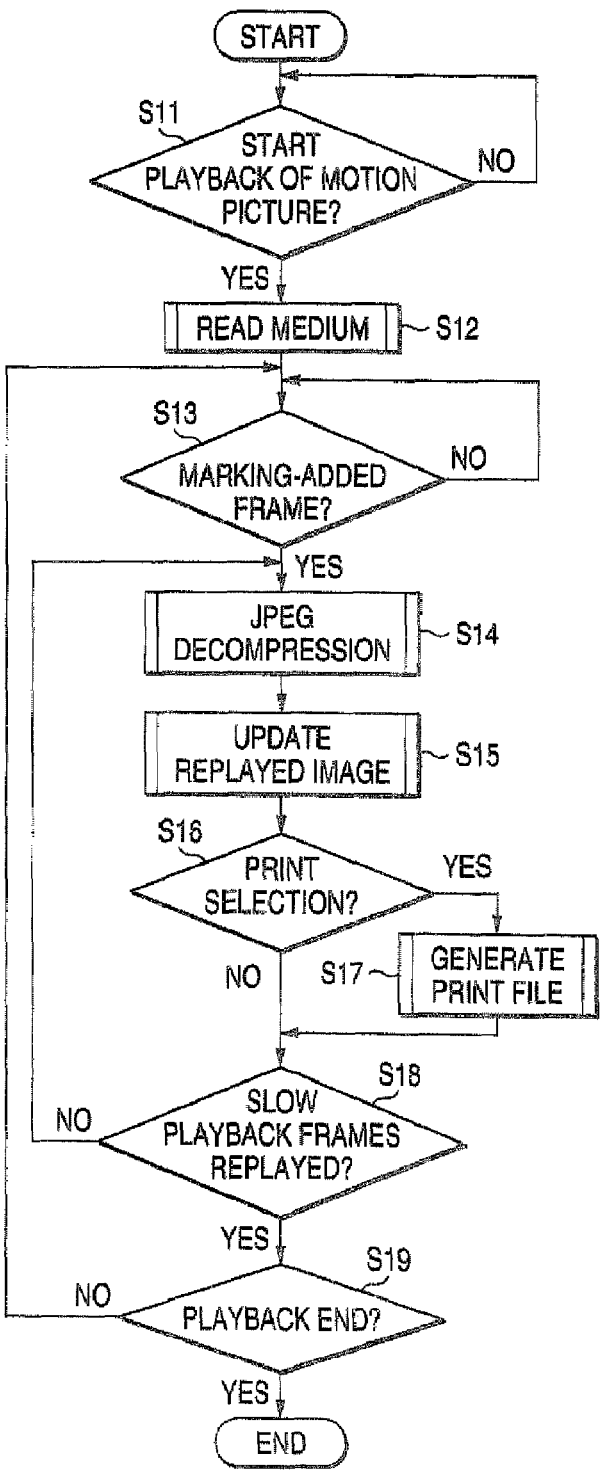

The operation of the digital camera 100 of the above configuration will be described referring to FIGS. 7A and 7B. FIGS. 7A and 7B are flowcharts showing the operation of the digital camera 100. FIG. 7A shows the operation flow of motion picture recording. FIG. 7B shows the operation flow of motion picture playback. The operation of the digital camera 100 described below proceeds mainly under the control of the main CPU 118. A series of operations of the digital camera 100 according to each of the flowcharts of FIG. 7A and FIG. 7B is controlled by the main CPU 118.

As shown in FIG. 7A, when the system is set to the motion picture shooting mode by the mode dial 114*a* ("Yes" in step S1) and start of recording is instructed by a press on the release switch 116 ("Yes" in step S2), processing to capture data of an image shot with the image pickup device 102 (step S3) is executed. The captured data undergoes a series of signal processing (step S4) in the analog signal processor 103, the A/D converter 104, the buffer memory 105, and the YC separator 107, then is sent to the compression/decompression processor 106, where the data is JPEG-compressed on a per frame basis (step S5). Following the JPEG compression, whether a marking instruction is made to the frame by the marking button 114*b* is checked (step S6). In case a marking instruction is made to the frame by the marking button 114*b* ("Yes" in step S6), marking data is added to the frame (compressed frame) (step S7) then motion picture file generation processing (step 8) is executed. In case a marking instruction is not made to the frame by the marking button 114*b* ("No" in step S6), motion picture file generation processing (step 8) is executed without addition of marking data. In the motion picture file generation processing (step 8), motion picture data comprising a plurality of frames is generated. When processing of all the frames of a single motion picture file is complete ("Yes" in step S9), the motion picture file is recorded onto the memory card 108 (step S10). In case recording is not complete ("No" in step S9), execution returns to step S3.

As shown in FIG. 7B, when the system is set to the playback mode by the mode dial 114*a* and motion picture playback is started in the playback mode ("Yes" in step S11), media read processing (step S12) is executed. In the media read processing (step S12), motion picture file data is sequentially read on a per frame (compressed frame) basis from the memory card 108. A frame where marking data is added is detected (step S13). When such a frame is detected ("Yes" in step S13), the frame is JPEG-decompressed (step S14) and the display on the regenerated image or image display LCD 112 is updated to the image of a newly JPEG-decompressed frame (step S15). Each time the playback image is updated (step S15), whether the image is selected as an image to be printed, that is, whether a print instruction on the frame being replayed is made by a press on the print button 114c (step S16) is checked. In case a print instruction is made ("Yes" in step S16), the print file of the frame is generated and recorded onto the memory card 108 (step S17).

Processing from step S14 to step S17 is repeated for a preset number of frames to undergo slow playback (10 frames in this example) (step S18 ends with "No" repeatedly). When the processing of the preset number of frames to undergo slow playback is over ("Yes" in step S18), in case subsequent frames are to be replayed ("No" in step S19), execution returns to the processing to detect a frame where marking data is added (step S13). In case no subsequent frames are found ("Yes" in step S19), the motion picture playback is terminated.

As mentioned above, when motion picture data is read, a frame where marking data is added is searched for (step S13). Each time the frame is detected ("Yes" in step S13), a predetermined number of frames (10 frames in the above example) starting with the frame are replayed slowly and a frame specified during slow playback is recorded as a print file onto the memory card 108. This identifies on a per frame basis a scene in motion picture data readily and in a short time and acquires a print file of the scene, without complicating the process of identifying a print target scene. The user presses the print button 114c when a frame to be printed is displayed during slow playback to record a print file onto the memory card 108.

It is possible to print a scene to be printed in the motion picture data by outputting the print file recorded on the memory card 108 to an external device such as a printer and a personal computer via the external device interface 110. It is also possible to print a desired scene to be printed by attaching the memory card 108 to a printer or a personal computer and reading a print file.

The invention is not limited to the aforementioned embodiment but various changes and modifications can be made in it as required. The shape, form, quantity and location of each component in the embodiment are arbitrary and not limited as long as they attain the invention.

While a predetermined number of frames starting with a frame where marking data is added are replayed slowly in reading motion picture data in this embodiment, a frame where marking data is added and a predetermined number of frames preceding and subsequent to the frame may be replayed slowly. While playback of frames not to be replayed slowly are skipped in this embodiment, those frames may be fast replayed instead of being skipped. The reason why a predetermined number of frames are replayed slowly is because it is easier to select an arbitrary frame (it is easier to identify a scene to be printed) from among the frames. However, an arbitrary frame playback speed may be selected; a regular playback speed (30 frames/second) may be used as well.

While the motion JPEG system is used as a motion picture compression system in this embodiment, another motion picture compression system, for example, a motion picture compression system to perform inter-frame predictive coding such as the MPEG (Motion Picture Experts Group) 2 may be employed.

While the main CPU 118 as control means comprises marking means for adding marking data to an arbitrary frame in motion picture data specified by the marking button 114b when the motion picture data is recorded onto the memory card 108, search means for detecting a frame where marking data is added while reading motion picture data from the memory card 108, playback means for replaying a frame decompressed by the compression/decompression processor 106, and still picture data recording means for recording as a print file a frame selected by a press on the print button 114c onto the memory card 108, the marking means, search means, playback means, and still picture data recording means may be provided separately from the main CPU 118, not integrally with the main CPU 118. In case the marking means, search means, playback means, and still picture data recording means are provided separately from the main CPU 118, these means may be connected to a common data bus 150 so as to communicate required information.

While the compression/decompression processor 106 comprises motion picture compression means for compressing on a per frame basis the motion picture data of a subject image shot with the image pickup device 102 and recording the compressed data onto the memory card 108, and motion picture decompression means for decompressing a frame where marking data is added and a predetermined number of frames in the neighborhood of the frame each time the frame is detected in this embodiment, the motion picture compression means and the motion picture decompression means may be provided separately from the compression/decompression processor 106, not integrally with the compression/decompression processor 106. In case the motion picture compression means and the motion picture decompression means are provided separately from the compression/decompression processor 106, these means may be connected to the common data bus 150 so as to communicate required information.

While the recording medium is a memory card such as a semiconductor recording medium in this environment, this invention is applicable to a case where a recording medium other than a semiconductor recording medium including an optical recording medium such as a DVD (Digital Versatile Disk), RAM (Random Access Memory), DVR-RW (Rewritable) and CD (Compact Disc)-RW, a magnetic recording medium such as a hard disk and a floppy disk, and a magneto-optical disk such as an MO (Magneto Optical Disk).

As mentioned hereinabove, according to the invention, the motion picture data of a subject image is compressed frame by frame and recorded onto a recording medium. In this practice, marking data is added to a frame to be printed in accordance with an instruction from the user. When the motion picture data recorded on the recording medium is read, a frame where marking data is added is searched for. Each time the frame is detected, the frame and a predetermined number of frames in the neighborhood of the frame are replayed. When an arbitrary frame displayed during playback is specified by the user, the frame is recorded as still picture data onto the recording medium. This identifies on a per frame basis a scene in motion picture data readily and in a short time and acquires the still picture data of the scene, without complicating the process of identifying a print target scene.

When a nonvolatile recording medium detachable from the digital camera main unit is employed as a recording medium provided on the digital camera of the invention, it is possible to attach the recording medium where print still picture data is recorded with the digital camera of the invention to an external device such as a printer and a personal computer to print a desired print target scene.

When an interface for outputting still picture data recorded on a recording medium to an external device is further provided on a digital camera of the invention, it is possible to output the still picture data of a print target scene from a digital camera of the invention to an external device for printing.

What is claimed is:

1. A digital camera comprising an image pickup device for shooting a subject image, motion picture compression means for compressing on a per frame basis the motion picture data of a subject image shot with said image pickup device and recording the compressed data onto a recording medium as compressed motion picture data, marking instruction means for instructing addition of marking data to an arbitrary frame in recording said motion picture data onto said recording medium, marking means for adding marking data to a frame specified by said marking instruction means, search means for reading to compressed motion picture data from said recording medium and for detecting a frame where said marking data is added from the compressed motion picture data read from the recording medium;

motion picture decompression means for decompressing the frame and a predetermined number of frames in the neighborhood of the frame on a per frame basis each time the frame where said marking data is added is detected by the search means, playback means for replaying the decompressed frame, selection means for selecting an arbitrary frame displayed during playback by said playback means, and still picture data recording means for recording a frame selected by said selection means as still picture data onto said recording medium.

2. A digital camera according to claim 1, wherein said recording medium is a nonvolatile recording medium detachable from a digital camera main unit.

3. A digital camera according to claim 1, further comprising an interface for outputting still picture data recorded on said recording medium to an external device.

4. A digital camera according to claim 1, wherein the marking instruction means instructs addition of marking data to the arbitrary frame in accordance with an instruction from a user.

5. A digital camera according to claim 1, wherein the playback means, in addition to the replaying of the decompressed frame, replays the predetermined number of decompressed frames in the neighborhood of the decompressed frame prior to the selection of the arbitrary frame by said selection means.

6. A digital camera according to claim 5, wherein the playback means replays the decompressed frame and the predetermined number of decompressed frames in the neighborhood of the decompressed frame at a playback speed that is less than half of a regular playback speed of the playback means.

7. A digital camera according to claim 6, wherein the playback is speed is one-fourth the regular speed.

8. A digital camera according to claim 7, wherein the decompressed frame and the predetermined number of decompressed frames in the neighborhood of the decompressed frame are converted to four-frame data.

9. A digital camera according to claim 5, wherein the selection means selects the arbitrary frame displayed during the playback in accordance with an instruction from a user.

10. A digital camera according to claim 1, wherein the selection means selects the arbitrary frame displayed during the playback in accordance with an instruction from a user.

11. A digital camera according to claim 5, wherein the predetermined number of decompressed frames in the neighborhood of the decompressed frame are frames preceding the decompressed frame.

12. A digital camera according to claim 5, wherein the predetermined number of decompressed frames in the neighborhood of the decompressed frame are frames subsequent to the decompressed frame.

13. A digital camera according to claim 5, wherein the predetermined number of decompressed frames in the neighborhood of the decompressed frame are frames preceding the decompressed frame and frames subsequent to the decompressed frame.

14. A digital camera according to claim 1, wherein the marking instruction means instructs addition of marking data to a plurality of frames, the marking means adds marking data to said plurality of frames specified by said marking instruction means, and said search means detects said plurality of frames where said marking data is added while reading motion picture data from said recording medium.

15. A digital camera according to claim 14, wherein the search means detects said plurality of frames where said marking data is added after an end of shooting the subject image.

16. A digital camera according to claim 1, wherein the search means detects the frame where said marking data is added after an end of shooting the subject image.

17. A digital camera according to claim 1, wherein the digital camera includes the recording medium.

18. A camera comprising an image pickup circuit that shoots a subject image and generates motion picture data;

a compression circuit that compresses on a per frame basis the motion picture data of the subject image shot with said image pickup circuit and records the compressed data onto a recording medium as compressed motion picture data, an instruction circuit that instructs addition of marking data to an arbitrary frame of the compressed motion picture data compressed by the compression circuit, while the image pickup circuit shoots the subject image;

a marking circuit that adds marking data to the arbitrary frame specified by said instruction circuit, wherein the marking circuit generates modified motion picture data of the subject image that includes the marking data to the arbitrary frame;

a first recording circuit that records the compressed and modified motion picture data generated by the marking circuit onto the recording medium;

a search circuit that reads the compressed motion picture data from the recording medium and detects a frame where said marking data is added from the compressed motion picture data read from the recording medium;

a decompression circuit that decompresses the detected frame and a predetermined number of frames in the neighborhood of the detected frame on a per frame basis each time a frame where said marking data is added is detected by the search circuit, a playback circuit that plays back the detected decompressed frame and the predetermined number of decompressed frames in the neighborhood of said detected frame, when the search circuit finds the detected frame;

a selection circuit for selecting a desired frame among the detected frame and the predetermined number of the frames in the neighborhood of said detected frame during playback by said playback circuit; and a second recording circuit that records the desired frame, selected via said selection circuit, as a still picture onto said recording medium.

* * * * *